United States Patent [19]

Harlow, Jr. et al.

[11] 4,263,980
[45] Apr. 28, 1981

[54] POWERTRAIN CRADLE FOR FRONT-WHEEL-DRIVE VEHICLE

[75] Inventors: John H. Harlow, Jr., Farmington Hills; Frank Atkinson, Jr., Warren; Caramello N. Stramer, Sterling Heights, all of Mich.

[73] Assignee: General Motors Corporation, Detroit, Mich.

[21] Appl. No.: 43,649

[22] Filed: May 30, 1979

[51] Int. Cl.³ .................................................. B60K 5/04
[52] U.S. Cl. ................................... 180/292; 180/299; 180/312; 180/297
[58] Field of Search ............... 180/297, 299, 298, 291, 180/312, 54 F, 89.17, 252, 292

[56] References Cited

U.S. PATENT DOCUMENTS

| 792,704 | 6/1905 | Harrington | 180/297 |
| 2,231,287 | 2/1941 | Fox | 180/297 |
| 2,954,998 | 10/1960 | Kushler et al. | 180/312 |
| 3,913,696 | 10/1975 | Kennedy et al. | 180/299 |

FOREIGN PATENT DOCUMENTS 1116073 10/1961 Fed. Rep. of Germany ........... 180/299

*Primary Examiner*—David M. Mitchell
*Attorney, Agent, or Firm*—R. L. Phillips

[57] ABSTRACT

In a front-wheel-drive vehicle having a powertrain with a transversely positioned engine and transmission and independent front wheel suspensions each with a control arm, there is provided a cradle forming a subframe supporting the power train and having the control arms pivotally mounted on the cradle. The cradle is cushion mounted on the vehicle body and has the powertrain components cushion mounted on it. The cradle includes side-rails connected by disconnectable front and rear cross-rails, each cross-rail being affixed to respective ones of the side-rails and being disconnectable from the other side-rail forming a substantially L-shaped section of the cradle. The cross-rails can be disconnected so that one of the L-shaped sections of the cradle can be pivoted away from the powertrain. This permits servicing of the powertrain components. Since the front wheels are supported on the side-rails, positioning the cradle is critical to the alignment of the front wheels. Gauge holes are provided for aligning one side-rail relative to the vehicle body. Also one of the cross-rails includes a positioning socket including a ferrule engageable with an aligning recess, one of which is formed in respective portions of one of the cross-rails. One of the cross-rail portions is movable with one of the L-shaped cradle sections which is pivoted away from the powertrain unit. Upon pivotal movement of the one L-shaped cradle section back underneath the powertrain and reassembly of the cross-rail to a side-rail with the socket members in place, the movable side-rail is precisely positioned into its original aligned position thereby retaining alignment of the vehicle front wheels.

3 Claims, 3 Drawing Figures

POWERTRAIN CRADLE FOR FRONT-WHEEL-DRIVE VEHICLE

TECHNICAL FIELD

The present invention relates generally to a motor vehicle frame construction for use with a transverse mounted powertrain including an engine and transmission assembly. More particularly, the invention relates to a motor vehicle subframe in the form of a cradle attached to the vehicle body for supporting the engine and transmission assembly in a transverse position and includes removable portions of the cradle whereby one side of the cradle can be split and pivoted away from the remainder of the assembly permitting service of the transmission or clutch in the assembly.

BACKGROUND

In the usual vehicle engine and transmission mounting arrangements presently used gaining access to either the transmission or portions of the engine is often difficult. Frequently, the frame cross member or the axially positioned side rails interfere with serviceability of the drive train components. The problem becomes more complex when both the engine and transmission are mounted in a position transverse to the longitudinal axis of the vehicle. Necessarily in such an arrangement, the engine components and the drive train units are situated in a more congested space as compared to a longitudinal installation because the transmission can be located underneath the forward portions of the vehicle passenger compartment.

THE INVENTION

This invention provides a motor vehicle frame in the form of a cradle for supporting a vehicle powertrain whereby the cradle is formed by the joining of two generally L-shaped sections. The L-shaped sections include a side-rail that extends longitudinally when mounted in the vehicle. Each of these side-rails has one end of a laterally extending cross-rail affixed to them while the other end of the cross-rail is capable of being releasably but rigidly secured to the opposite axially extending side-rail. The assembled structure constitutes a cradle substantially in the form of a rectangle with the laterally extending cross-rails being removably connected to the axially extending side-rails. The side-rails each pivotally support a control arm of an independent front wheel suspension system. When secured to the vehicle body, the cradle position is critical for alignment of the front vehicle wheels. Accordingly provisions are made to insure precise positioning of the cradle when it is initially secured to the vehicle body and when it is reassembled into position after service is completed upon a component in the powertrain assembly. This feature is accomplished by providing gauge holes in one of the L-shaped sections of the cradle assembly. For purposes of illustration these holes are provided in the vehicle right-hand longitudinally extending side-rail and its associated rear laterally extending cross-rail forming one of the generally L-shaped portions of the cradle. The gauge holes in this right-hand side-rail align with gauge holes in the vehicle body permitting initial precise location of this rail relative to the vehicle body. The rearward laterally extending cross-rail can be formed of C-shaped channel stock having a female socket provided for receiving a relatively short male extending portion of the rear cross-rail fixedly secured to the left side-rail. This left side-rail has a laterally extending cross-rail fixedly secured near its forward end. This forward cross-rail is bolted to the right-hand side-rail rigidly connecting the two side-rails together. As previously mentioned, the male portion of the rear cross-rail is received within the female socket of the right-hand rear cross-rail and is bolted in position thereby completing a rigid fixed rectangular cradle assembly. When servicing a component of the vehicle powertrain, the cradle is split by disconnecting the front cross-rail from the right-hand side-rail and removing the male portion of the rear cross-rail from the socket receiving portion fixedly attached to the right-hand side-rail. The left-hand half of the cradle is then pivoted out of the way around the left-hand ball joint assembly permitting service of a transmission or powertrain component. Upon assembly the front cross beam is bolted to the right-hand side-rail and the rear cross-rail is assembled together in a precisely aligned position by virtue of an extruded alignment socket assembly at the junction of the rear cross-rail members precisely repositioning the cradle as originally determined assuring front wheel alignment.

THE DRAWINGS

Figure 1:
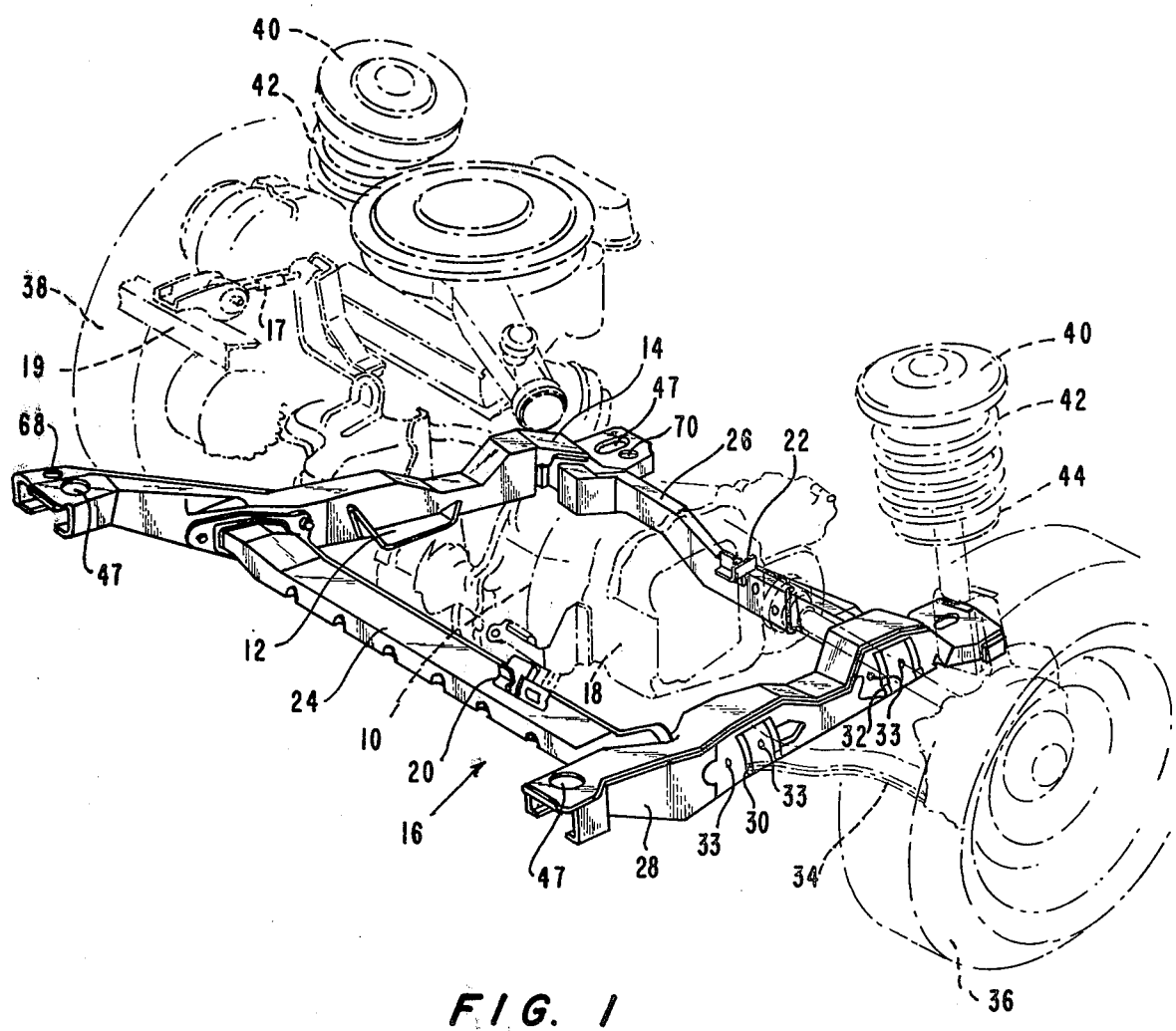
FIG. 1 is a perspective view of a cradle shown mounted at the front of a vehicle and supporting a transversely mounted powertrain unit illustrated in phantom, the independent front wheel suspension components also being shown in phantom.

Referring now to the drawings and particularly to FIG. 1, a vehicle engine 10 is positioned transversely of a vehicle and is supported in a cradle mounted bracket 12 welded or otherwise secured to a side-rail 14 of a cradle assembly 16. A rigid strut 17 connected between the vehicle body 19 and the upper portions of engine 10 regulates pitch of the powertrain. A transmission assembly 18 is connected with the engine 10 and is supported by brackets 20 and 22 likewise welded or otherwise secured respectively to a front cross-rail 24 and a rear cross-rail 26 of the cradle assembly 16. The cross-rails 24 and 26 are connected to side-rail 14 and side-rail 28 forming a rigid substantially rectangular shaped cradle assembly. With continuing reference to FIG. 1, the side-rails 14 and 28 have brackets 30 and 32 secured, preferably by welding, to each of the side-rails. The brackets 30 and 32 contain aligned apertures 33 for the pivotal mounting of respective lower control arms 34 on the left and right sides of the vehicle, each control arm supporting front wheels 36 and 38. The control arms 34 are suspended with a MacPherson type strut arrangement 40 which includes telescoping coil springs 42 and hydraulic shock absorbers 44 so that the front vehicle wheels are suspended in a somewhat conventional manner. The side rails 14 and 28 contain apertures 47 of a predetermined shape which are located at a specific point in the side rail for receipt of resilient cushioning assemblies, not shown. The cushion assemblies are used for securing the cradle assembly 16 to the vehicle body, which is also not shown. This precise mounting arrangement for securing the cradle and consequently the engine transmission and differential assembly to the vehicle body is shown in a copending application Ser. No. 29,625 entitled "Powertrain and Independent Suspension Mounting Arrangement for Front-Wheel-Drive Vehicle" filed Apr. 13, 1979 by the assignee of this invention.

Figure 2:
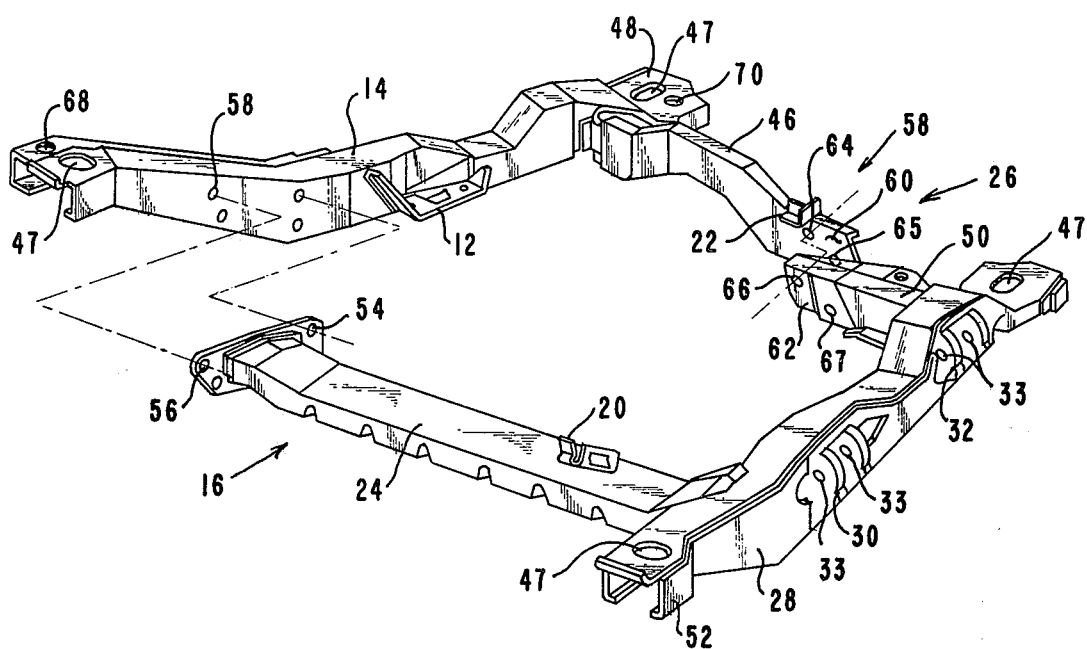
FIG. 2 is a perspective view of the subject cradle with its cross-rails in a disassembled position.

With reference now to FIG. 2, the cradle assembly 16 is shown in a separated condition illustrating the two disassembled portions of the cradle being substantially L-shaped in form. The vehicle right side-rail 14 has a relatively long portion 46 of rear cross-rail 26 affixed inwardly of its rear end 48 while a relatively short portion 50 of the rear cross-rail is affixed to a left side-rail 28. The vehicle left side-rail 28 has the front cross-rail 24 affixed inwardly of end 52 forming one of the aforementioned substantially L-shaped sections. The front cross-rail 24 has a flange 54 secured to its free end, the flange containing a plurality of bolt holes 56. The right side-rail 14 is substantially C-channel shaped in form and is configured to receive flange 54. It also contains bolt holes 58 in alignment with the holes 56 for releasably securing the flange to the side-rail 14.

As previously described, the right side-rail 14 has engine mounting bracket 12 affixed thereto at a predetermined location while the cross-rails 24 and 26 each have brackets 20 and 22 affixed thereon for supporting the transmission assembly 18 associated with the engine 10 as illustrated in phantom in FIG. 1. Also the side-rails 14 and 28 have brackets 30 and 32 welded in predetermined locations for pivotally mounting control arms 34 each of which supports a front vehicle wheel 36 and 38, also shown in phantom in FIG. 1.

The rear cross-rail 26 includes a relatively long portion 46 and a relatively short portion 50, each of which are rigidly secured to the respective side-rails 14 and 28. The portions 46 and 50 are releasably joined at a juncture in the form of a socket assembly 58. The socket assembly 58 comprises, for purposes of illustration only, a female member 60 which receives a male member 62, each member containing drilled apertures 64, 65, 66 and 67 for receipt of fastening bolts not shown. Obviously, the female member 60 of the socket assembly could be formed upon the short portion 50 of rear cross-rail 26 and the male member 62 of the socket assembly could be formed upon the relatively long portion 46 of rear cross-rail 26 and still permit the objective of the invention to be accomplished.

Figure 3:
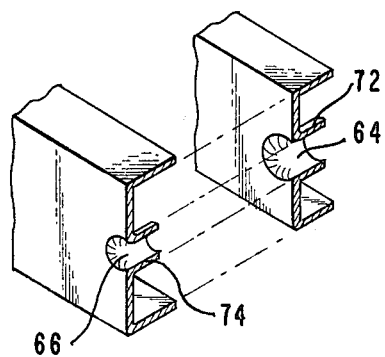
FIG. 3 is an enlarged partial perspective view, partly in section, illustrating the aligning socket assembly provided in one of the disconnectable cross rails of the subject split cradle.

Referring now to FIGS. 2 and 3, the right side-rail 14 is formed to contain gauge holes 68 and 70 for precisely locating and mounting the side-rail 14 upon the vehicle body. By precisely locating side-rail 14 the cradle assembly 16 in its assembled condition is precisely positioned relative to the vehicle body for purposes later to be described. As illustrated in FIG. 3, the apertures 64 and 66 in the socket assembly 58 are extruded to form an alignment recess 72 which receives an aligning ferrule 74 formed on the short portion 50 of cross-rail 26 in a relatively tight engagement due to specific sizing of the ferrule relative to that of recess 72. As previously described the alignment recess 72 can be extruded into either the long portion 46 or the short portion 50 of the rear cross-rail 26 while the ferrule 74 can be extruded into the other member for precisely positioning the rear cross-rail when the cradle is assembled.

In operation, the cradle 16 is assembled and supports the powertrain components as illustrated in FIG. 1. In the event a component of the powertrain assembly needs to be serviced, the bolts securing flange 54 to right side-rail 14 are removed from the apertures 56 and 58 releasing the front cross-rail 24 for movement away from right side-rail 14. The cushioning mounts in apertures 47 are likewise disconnected from the vehicle body and the bolts securing the socket assembly 58 are removed from apertures 64, 65, 66 and 67 permitting withdrawal of the ferrule 74 from the aligning recess 72. In addition the transmission mounts are loosened, the conventional stabilizer bars removed and the engine is supported prior to swinging the left hand portion of the cradle around the left hand ball joint permitting servicing of a clutch or transmission in the powertrain assembly.

The advantages of the subject invention obviously reside in the provision of a cradle capable of being split to provide accessibility to powertrain components of a front-wheel-drive motor vehice. The right side-rail 14 of the cradle 16 is precisely positioned relative to the vehicle body via the aforementioned gauge holes 68 and 70. The front cross-rail 24 has a predetermined length in accordance with the design of the particular vehicle body. The slip connection in the rear cross rail whereby the long portion 46 is secured to the relatively short portion 50 to form the assembled cross-rail 26 permits an initial welding of these portions to the respective side rails providing a precise predetermined cross car dimension. Utilization of the extruded socket assembly 58 in the members 46 and 50 whereby a clearance between the specific socket portions including the aligning recess 72 and the ferrule 74 result in a fit within a predetermined tolerance. This tolerance control precisely positions the left side-rail 28 when it is again secured in place upon the completion of servicing of the powertrain components. In this manner the alignment of the vehicle wheels is again assured upon assembly of the cradle to the vehicle body. Thus, the above described preferred embodiment is intended to be illustrative of the invention which may be modified within the scope of the appended claims.

The embodiments of the invention in which an exclusive property or privilege is claimed are defined as follows:

1. In a front-wheel-drive vehicle having a transversely positioned engine connected with a transmission and a differential constituting together a powertrain: the improvement comprising; a cradle assembly for cushion mounting the transversely positioned engine and the associated powertrain components relative to the vehicle body, said cradle being rigid and substantially rectangular in form and including a pair of side-rails joined by a front cross-rail and a rear cross-rail, said front cross-rail having one end affixed to one of said side-rails and having its other end releasably secured to the other of said side-rails, said rear cross-rail having its ends affixed to respective ones of said side-rails and being selectively separable into two sections at a juncture between said side-rails, means on one of said side-rails aligning that particular side-rail relative to the vehicle body and means on each of said sections of said rear cross-rail at the separable juncture thereof precisely aligning said sections and consequently the other of said side-rails when they are assembled and said cradle is supporting the powertrain.

2. In a front-wheel-drive vehicle having a transversely positioned engine connected with a transversely positioned transmission and drivingly connected with a differential, the assembled components constituting a powertrain, said powertrain being cushion mounted upon a cradle in the form of a subframe, the cradle subframe being resiliently mounted upon the vehicle body the improvement comprising: said cradle being rigid and substantially rectangular in form and including a pair of side-rails joined by a front cross-rail and a rear cross-rail; said front cross-rail having one end affixed to one of said side-rails and having its other end releasably secured to the other of said side-rails; a flange formed on the releasable end of said front cross-rail having a plurality of holes therein for receiving bolts releasably securing said flange to said side-rail; said rear cross-rail having its ends affixed to respective ones of said side-rails and being selectively separable into two portions at a connection juncture between said side-rails, one portion of said rear cross-rail including a female socket at said juncture; the other of said sections including a male member at said juncture and being formed to fit within the female socket in the other of said portions; aligning means in the form of extruded holes in each of said portions, one being larger in diameter than the other forming an alignment recess such that the extruded portion of the smaller fits within the recess of the larger forming an aligning connection in said rear cross-rail; and means on one of said side-rails for initially positioning the cradle assembly upon the vehicle body in an aligned position permitting alignment of the front vehicle wheels; the separable portions of the cross-rails permitting the disconnection of one side-rail from the other and swinging movement of the disconnected rail away from the powertrain assembly whereby the powertrain can be readily serviced; the reconnection of the cross-rails in their respective assembled positions retaining precise alignment of the front vehicle wheels.

3. In a front-wheel-drive vehicle having a transversely positioned engine and a transversely positioned transmission connected with a differential, the components constituting a powertrain assembly: the improvement comprising a cradle for cushion supporting the transversely mounted powertrain assembly relative to the vehicle body; said cradle being rigid and substantially rectangular in form and including a pair of side-rails joined by a front cross-rail and a rear cross-rail; the front and rear cross-rails being connected to said side-rails inwardly of their terminal ends; the vehicle right side-rail including a bracket for receiving a resilient engine mount; the cross-rails having brackets secured thereon for supporting the transmission assembly; brackets welded on the outer sides of both the vehicle left and right side-rails for pivotally supporting wishbone shaped lower control arms which in turn support the respective front vehicle wheels; said vehicle left side-rail containing gauge holes for precisely initially positioning the cradle assembly relative to the vehicle body; predetermined surfaces and apertures near the ends of each of the said side-rails for resiliently attaching the cradle assembly to the vehicle body; a flange formed on the vehicle right end of said front cross-rail; said flange being releasably bolted to the vehicle right side-rail; a disconnectable juncture in said rear cross-rail near said vehicle left side-rail; a female socket formed in a respective relatively long portion of said rear cross-rail; a male member formed on a respective relatively short portion of said rear cross-rail cooperating with said female socket forming said juncture; said disconnectable juncture being releasably held together through the use of a bolt connection; and an extruded hole in the male portion of said rear cross-rail socket forming an alignment ferrule; an extruded hole in said female portion of said rear cross-rail forming an alignment recess; the extruded hole forming the recess having diameter of a specific size relative to the extruded hole forming the ferrule providing a close fit thereby precisely positioning the vehicle left side-rail relative to the vehicle right side-rail when the cradle is in an assembled position; said releasable connections in said front and rear cross-rails permitting removal of the vehice left side-rail and pivotal movement thereof away from the components of said powertrain whereby servicing of the powertrain components can be readily accomplished and said vehicle left side-rail reconnected to the vehicle right side-rail in a precise predetermined position retaining alignment of the vehicle front wheels.

* * * * *